United States Patent [19]

Sorton et al.

[11] Patent Number: 5,274,680
[45] Date of Patent: Dec. 28, 1993

[54] DEVICE FOR THE TRANSMISSION OF SYNCHRONOUS INFORMATION BY AN ASYNCHRONOUS NETWORK, NOTABLY AN ATM NETWORK

[75] Inventors: Gérard Sorton, Argenteuil; Thierry Grento, Clamart, both of France

[73] Assignee: Thomson-CSF, Puteaux, France

[21] Appl. No.: 796,429

[22] Filed: Nov. 22, 1991

[30] Foreign Application Priority Data

Nov. 23, 1990 [FR] France .................. 90 14625

[51] Int. Cl.⁵ .............. H04L 7/00; H04L 25/36; H04L 25/40
[52] U.S. Cl. .................. 375/118; 375/108; 375/112; 370/105.3; 370/102
[58] Field of Search ............ 375/118, 112, 108; 370/102, 108, 105.4, 105.3

[56] References Cited

U.S. PATENT DOCUMENTS

| | | | |
|---|---|---|---|
| 3,873,773 | 3/1975 | Guy, Jr. ................ | 375/112 |
| 4,392,234 | 7/1983 | Maruta ................. | 375/118 |
| 4,764,941 | 8/1988 | Choi ................... | 375/112 |
| 5,052,025 | 9/1991 | Duff et al. ............ | 375/118 |
| 5,077,761 | 12/1991 | Tokunaga .............. | 375/118 |
| 5,131,013 | 7/1992 | Choi ................... | 375/118 |
| 5,146,477 | 9/1992 | Cantoni et al. ......... | 375/118 X |

OTHER PUBLICATIONS

Proceedings International Switching Symposium 1987, Phoenix, Ariz., US, Mar. 15-20, 1987, pp. 969-973; F. Van Den Dool, Synchronization Aspects of ATD-IBC Networks.

Proceedings IEEE Global Telecommunications Conference, Dallas, Tex., US, Nov. 27-30, 1989, pp. 728-732; H. M. Ahmed, Adaptive Terminal Synchronization in Packet Data Networks.

*Primary Examiner*—Curtis Kuntz
*Assistant Examiner*—Bryan Webster
*Attorney, Agent, or Firm*—Oblon, Spivak, McClelland, Maier & Neustadt

[57] ABSTRACT

A device for the transmission of synchronous information by an asynchronous network, notably an ATM type network, where information elements are conveyed by packets of data bits between a transmitter unit and a receiver unit. Each of these packets is formed by an information cell comprising a header carrying an address and a useful field bearing the information to be transmitted. The transmitter unit and the receiver unit work with each other in a synchronous mode on the basis of respective plesiochronous local clocks. The device detects and compensates for a lengthy fading of transmission of the flow of information cells received by the receiver unit. The device also detects and compensates for a loss or insertion of cells in the flow of information cells received by the receiver organ. The device further reduces the jitter introduced by the asynchronous transmission of the information elements into the network and compensates for the relative plesiochronism of the local clocks of the transmitter unit and the receiver unit.

8 Claims, 4 Drawing Sheets

DEVICE FOR THE TRANSMISSION OF SYNCHRONOUS INFORMATION BY AN ASYNCHRONOUS NETWORK, NOTABLY AN ATM NETWORK

BACKGROUND OF THE INVENTION

1. Field of the Invention

The present invention relates to asynchronous transmission networks, notably networks of the so-called ATM (asynchronous transfer mode) type.

In these networks, digital information elements are transmitted discontinuously in the form of packets, called "information cells" in ATM terminology. This mode of transmission consists, instead of an octet-by-octet transmission, in constituting a packet of bits in the transmitter terminal equipment (the data source) as and when the digital data are created, and in waiting to constitute a complete information cell and in sending it to the network.

The transmitter equipment thus produces information cells at a variable rate, depending on whether or not it uses the channel (for example no cell is transmitted during the instants of silence) or at the variable rate at which the digital information elements are produced (for example in the typical case of the differential video signals, the data volume of which depends on the variably movable character of the image to be transmitted).

The information cell that will transit on the network comprises firstly a header that carries an address or "virtual channel identifier" and, secondly, a useful field that is a carrier of the information to be transmitted.

The information cells coming from several transmitters are mixed in a continuous flow, possibly with interposed empty cells that transit along high bit rate arteries.

The different arteries of the network connect a plurality of nodes, each corresponding to a switching device that provides for the demultiplexing and multiplexing of the flow of cells as a function of the address contained in the header and of the resources available at the instant considered.

The network is asynchronous in that each node of the network has a particular clock having its own frequency (and hence its own drift) without any coordination for the mutual adjustment of the clocks of the different nodes.

2. Description of the Prior Art

To take account of the inevitable differences in frequencies, buffer memories provide for the adjustments between the input and output rates of each node. It is seen that, in principle, the network is always furnishes the rate to the terminals connected to it.

The particular feature of an ATM type network relates to the fact that the switch restricts itself to managing only the header of each information cell in determining the destination address from the header of the incoming cell and in computing, from this parameter, a new header that corresponds to the (virtual) channel that will have been assigned to the switched-over artery downline from this node.

In particular, no verification (such as an intrinsic error check, acknowledgment protocol etc.) is carried out on the data transmitted, the checks if any being transferred to the two ends of the line, i.e. to the two devices that exchange the information which, therefore, have to check the integrity and conformity of the information elements exchanged.

In general, a service corresponds to a transfer of information between two devices, each connected to a node providing access to the network, hence capable of having a difference in rate, the respective local clocks of each of these nodes being neither synchronous nor synchronized.

Services with a duration limited to a few minutes can generally make do with this absence of synchronization between nodes, given the precision and the stability of the clocks used, which is of the order of $10^{-8}$ at least.

However, in certain situations, the users may have to exchange synchronous information, either because they use synchronous terminals or because the asynchronous network is in fact only a sub-assembly of a more extensive network, including for example a synchronous switch to which the asynchronous network has to be connected.

SUMMARY OF THE INVENTION

One of the aims of the invention is to permit a mode of operation such as this in a enabling an essentially asynchronous network in synchronous mode, i.e. enabling each of the devices connected to the network to function with rates that are exactly identical, hence truly synchronous and not simply plesiochronous (plesiochronous rates being rates that have the same frequency but are not coordinated, hence subject to possible drifts of the clocks, however powerful these clocks may be).

In other words, the aim of the invention is to emulate a synchronous circuit by an asynchronous network, i.e. to make a service synchronous in an asynchronous network.

Achieving this will entail coping with a plurality of transmission anomalies that will have to be taken into account and corrected.

It is possible to enumerate essentially five transmission anomalies:

first of all, very long interruptions in transmission, lasting more than several hundreds of milliseconds: in such a case, the network will consider the circuit to be cut off and will try to set up another one;

long interruptions (fading) of transmission, which may last up to some hundreds of milliseconds: in this case, a part of the information will be lost but it will be necessary, all the same, to maintain the synchronization of the clocks between the two devices (the maintaining of the "continuity of the circuit" despite the loss of information);

the loss or the insertion of some cells, due to brief spells of fading in transmission, lasting from some bits to some cells: indeed, if the brief fading touches the header of the cell, the address contained in it will deteriorate and the cell will therefore be directed towards another artery; these routing errors, which could lead to the disappearance of cells or to the insertion of foreign cells from other communications, have to be detected and compensated for so as to preserve the synchronization through the maintenance of the integrity of the number of cells transmitted;

the jitter in the network: in the case of an asynchronous network, owing to the use of buffer memories to provide for the adjustments between the incoming and outgoing rates of each node, a variable delay (jitter) appears from one cell to the next one, due to the fluctuations in the waiting period in each transit node of the network; since, in order to work in an asynchronous mode, it is sought to restore the bits at the same frequency at an output as at an input, it will be necessary to filter and compensate for these fluctuations;

finally, the slow drift between the transmission clock and the reception clock will, if not compensated for, inevitably introduce a fault in synchronism between the transmission and reception clocks: it will therefore be necessary to provide for a permanent compensation for this drift, if it is desired to obtain a truly synchronous and not merely a plesiochronous operation.

One of the aims of the present invention is to overcome these different transmission anomalies (except for very long transmissions which lead to a non-recuperable break in the circuit) in compensating for the different losses or duplications of information elements due to the plesiochronism of the clocks over fairly long periods of time or for continuous services.

As shall be seen, the present invention will make it possible to compensate for the long-term drift between the two clocks, while at the same time smoothing the jitter which is typical of an asynchronous transmission owing to the variable periods in the queues, as well as transmission anomalies such as transmission errors and varyingly short spells of fading of propagation.

To this effect, the present invention, which is a device of the above-mentioned type, i.e. a device for the transmission of synchronous information by an asynchronous network, notably an ATM type network, in which the information elements are conveyed by packets of data bits between an transmitter unit and a receiver unit, each of these packets being formed by an information cell comprising, firstly, a header carrying an address and, secondly, a useful field bearing the information to be transmitted, the transmitter unit and the receiver unit working with each other in synchronous mode on the basis of respective plesiochronous local clocks, wherein said device comprises:

means to detect and compensate for the lengthy fading of transmission of the flow of information cells received by the receiver unit;

means to detect and compensate for the loss or insertion of cells in the flow of information cells received by the receiver organ;

and means to reduce the jitter introduced by the asynchronous transmission of the information elements into the network and to compensate for the relative plesiochronism of the local clocks of the transmitter unit and the receiver unit.

Very advantageously, the receiver unit has a restoration buffer receiving, at an input, the flow of information cells at the irregular rate of the asynchronous network and delivering, at an output, these information cells at the regular rate of the local clock.

In this case, the means to detect and compensate for the long fading of transmission of the flow of information cells received by the receiver unit may notably comprise means to:

count the number of cells received at an input and the number of cells delivered at an output by the restoration buffer and give an instantaneous value of the corresponding difference;

compare this difference with a predetermined threshold; and in the event of this threshold being crossed, to generate filler cells at the local clock rate and apply these cells to the input of the restoration buffer.

Said means to detect and compensate for the loss or insertion of cells into the flow of information cells received by the receiver may notably include means to:

establish a transmission count value, by local counting of the number of cells delivered to the network by the transmitting organ;

periodically generate a specific cell containing the count value thus established and transmit this specific cell tot he receiver unit through the network;

establish a reception count value, by local counting of the number of cells received from the network by the receiver unit;

discriminate, among the cells received by the receiver unit, the specific cells from the information cells proper;

compare, at each reception of a specific cell, the locally established reception count value with the corresponding transmission count value contained in this specific cell;

and, in the event of a difference between the values thus obtained, increment or decrement, as the case may be, an address pointer of the restoration buffer by this difference.

The means to reduce the jitter introduced by the asynchronous transmission of the information into the network and to compensate for the relative plesiochronism of the local clocks of the transmitter unit and the receiver unit may notably include means to servo-link the local clock of the receiver unit to an error signal as a function of the degree of filling of the restoration buffer.

BRIEF DESCRIPTION OF THE DRAWINGS

Other features and advantages of the invention shall appear from the following detailed description, made with reference to the appended drawings.

DESCRIPTION OF THE PREFERRED EMBODIMENTS

Figure 1:
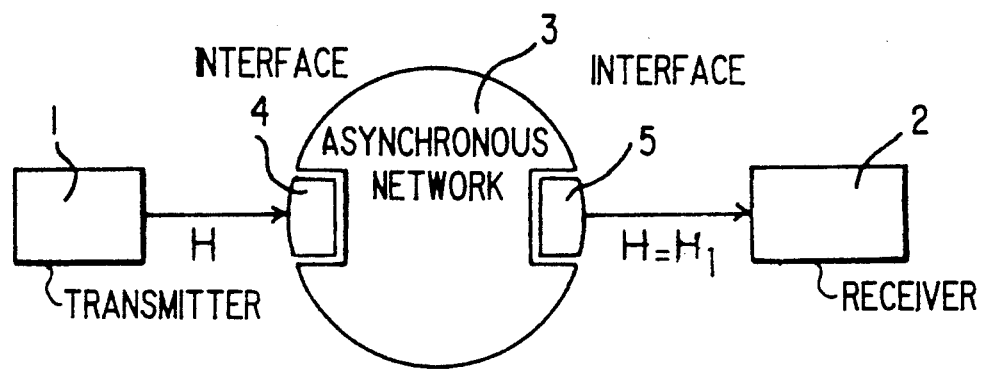
FIG. 1 gives a schematic view of an asynchronous transmission network connecting two input and output devices.

In FIG. 1, the reference 1 designates a terminal device working in synchronous mode at a rate $H_1$.

This device transmits towards a receiver device 2, which is also synchronous, working at a rate H that should be the same as the rate $H_1$ of the transmitter device. The transmission of the data is done by an asynchronous network symbolized by the reference 3, the interfacing between the synchronous devices 1 and 2 and the asynchronous network 3 being managed by the linking interfaces 4, 5 which may be devices integrated into the transmitter or receiver device as well as devices made in the form of distinct packs enabling the synchronous devices to be matched with the asynchronous network.

The invention can be applied notably to the processing of a continuous transfer of information elements by digital train at 2.048 Mbits/s in an ATM network using high-speed arteries at 34.368 Mbit/s, conveying cells of 32 octets of useful load, corresponding to the generation, at the source node, of one cell every 125 µs.

However, the method is naturally not limited to these digital values, and may be applied at other artery and service bit rates, provided that the ratio between these two sets of values remains greater than a given threshold (of the order of 10 to 15) making it possible to carry out a decorrelation of delays, between successive cells of one and the same service, this decorrelation being sufficient to compensate adequately for the jitter introduced by the network.

Furthermore, even though for the requirements of the present description, a transmitter device 1 and a receiver device 2 are considered herein, the invention naturally applies to devices that are both transmitter and receiver devices, i.e. working as two-way links.

Figure 2:
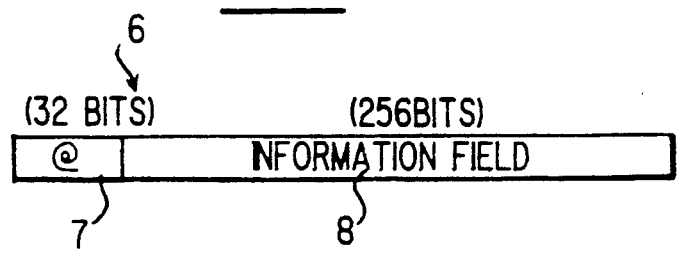
FIG. 2 shows the general structure of an information cell transmitted by a network such as this.

The information cells transmitted by the asynchronous network take the form illustrated in FIG. 2, i.e. each cell 6 has a header 7 containing an address used for the routing of the cell and a useful field 8 carrying the information to be transmitted proper. The dimensions of the fields 7 and 8 are, typically, 32 and 256 bits respectively, but other dimensions could equally well be envisaged.

As the network 3 works with its own clocks and, furthermore, given the possible disturbances mentioned above, when there is no processing whatsoever, no downline clock rate H is found that is strictly identical to the upline clock rate.

The problem therefore consists in analyzing the flow of incident cells at the interface 5 of the receiver unit, and in detecting and correcting the transmission anomalies so as to servo-link the local restoration clock to a rate H that is identical to the rate $H_1$ of the source information.

Figure 3:
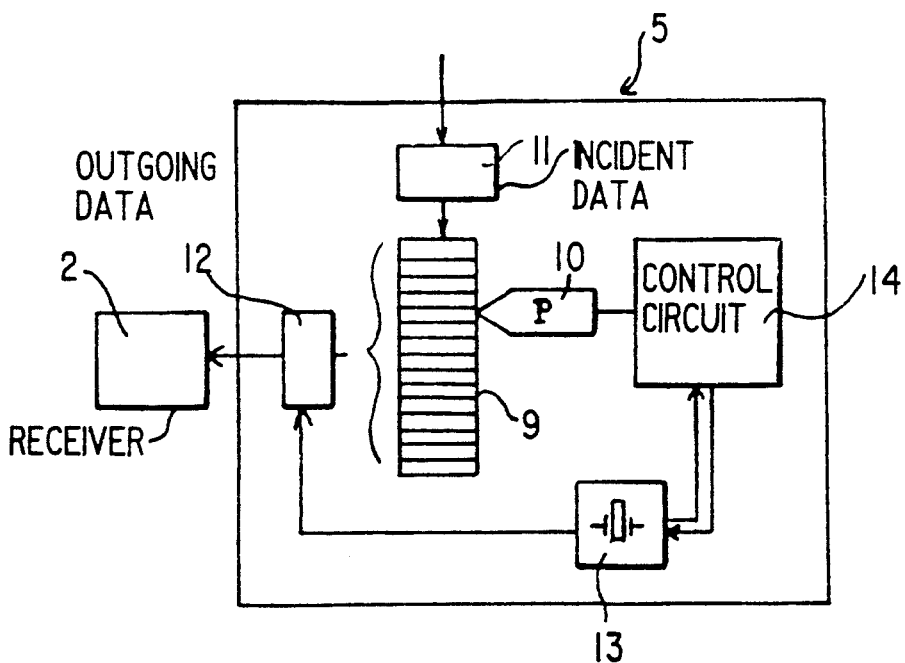
FIG. 3 is a graph showing the structure of the main elements of the receiver enabling the implementation of the characteristics of the invention.

FIG. 3 illustrates the general structure of the interfacing circuit 5.

This circuit has a buffer 9 working in "first in first out" queue mode, the buffer 9 being addressed by a pointer 10 and having the role of carrying out the adjustment between the rate of the incident data elements (circuit 11) and outgoing data elements (circuit 12) delivered to the synchronous device 2.

This device has a local clock 13 controlling the delivery, at output, of the information elements (it is a restoration clock), this clock being servo-linked by means of a circuit 14 controlling the addressing of the pointer of the buffer in the manner that shall be indicated further below.

Figure 4:
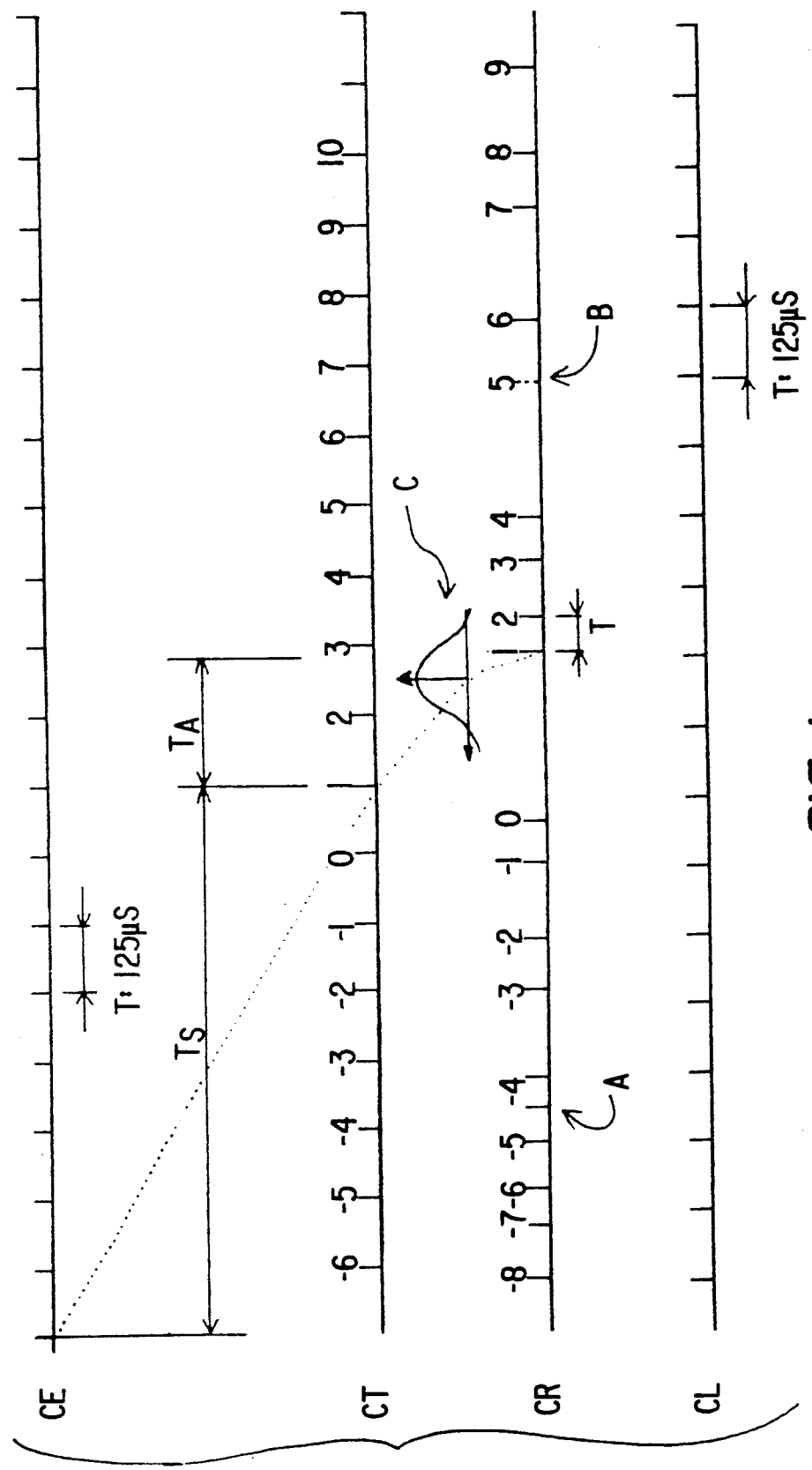
FIG. 4 presents various timing diagrams showing the synchronization beeps at different levels of the transmission.

FIG. 4 shows a certain number of timing diagrams showing the relative position, in time, of the synchronization beeps corresponding to the starting instants of each of the cells of information elements.

The timing diagram CE (transmitted cells) corresponds to the rate of the cells transmitted by the transmitter element 1, at the rate H. In this example, the transmitter unit generates a cell every 125 µs, corresponding to a continuous flow of cells with a useful load of 256 bits each, transmitted at a rate of 2.048 Mbits/s.

The period of time taken by a cell to go through the asynchronous network is made up of two parts:

a constant part for a virtual circuit, related to the time $T_s$ of electromagnetic propagation and of the crossing of the electronic circuits;

a variable part related to the load of the arteries travelled through, constituted by a mean value $T_a$ and an instantaneous variation around this mean value.

After a period of synchronous transmission $T_s$, this flow of data is recovered at the interface 4 with a time lag but without any loss of synchronism as illustrated in figure, plot CT. The dotted line in FIG. 4 shows the transmission time of the transmitted cells through the asynchronous network.

After transmission by the asynchronous network 3, i.e. at input of the interface 5, there is again the flow of transmitted cells (CT) with the configuration indicated at CR (received cells). In addition to the period of transmission $T_s + T_a$ in the asynchronous network, it may be noted that:

parasite cells have been introduced, as illustrated at A, transmitted cells have been lost, as illustrated at B, and the rate of reception of the cells has become uneven, owing to the variable delays in the different queues of the nodes of the network (the jitter phenomenon, typical of the asynchronous network); in other words, the time interval t between two cells received is no longer constant, as in the case of the synchronous transmission, but has only a mean value (in this case equal to 125 µs, with a standard deviation of the order of 60 µs).

The aim of the device of the invention is the production, from the analysis of these CR (received cell) beeps, of CL (local cell) beeps that have exactly the same rate (periodicity t = 125 µs) as that of the transmitted cells CE, this being obtained through a compensation for the different phenomena of loss of information, of the jitter of the network and of the drifts of the clocks.

Figure 5:
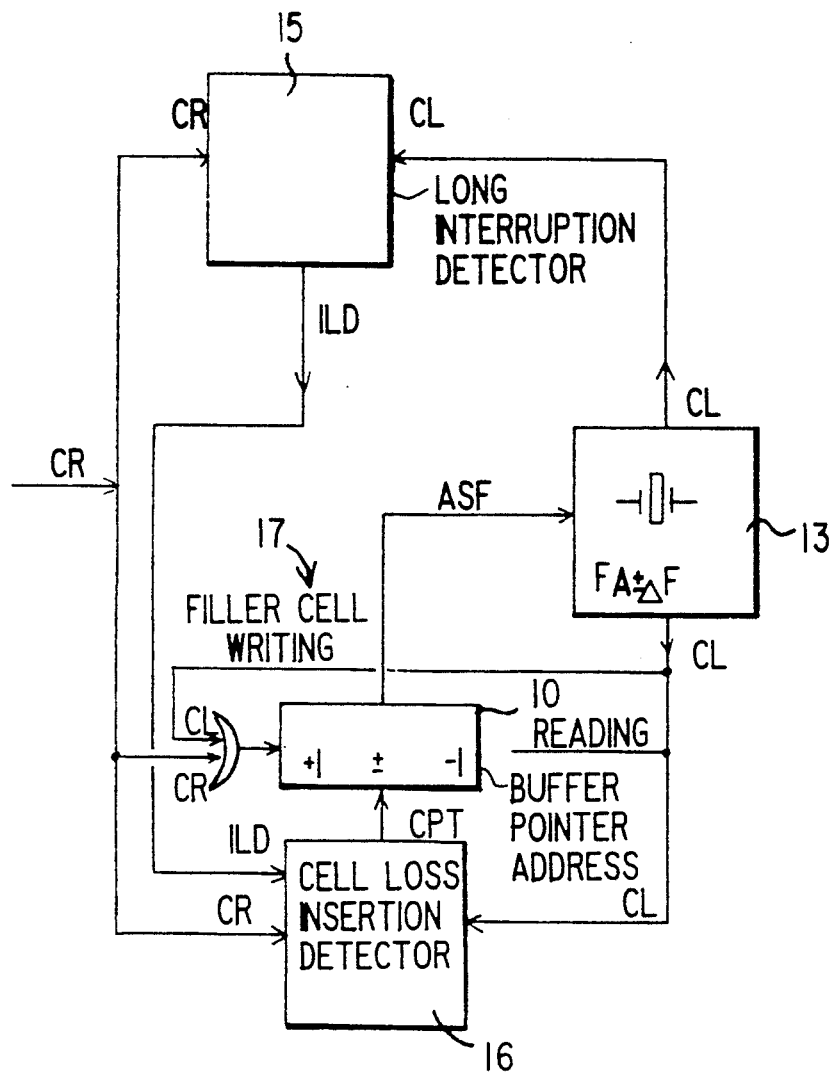
FIG. 5 is a block diagram illustrating the different functional elements of the device of the invention.

A circuit enabling this aim to be achieved has been shown schematically in FIG. 5.

In addition to the restoration clock 13 mentioned further above, generating the beeps of local cells CL, it essentially includes a detector 15 of long interruptions, a detector 16 of losses and insertions of cells and a circuit 17 for compensating for the jitter and for the drifts of the clock.

Figure 6:
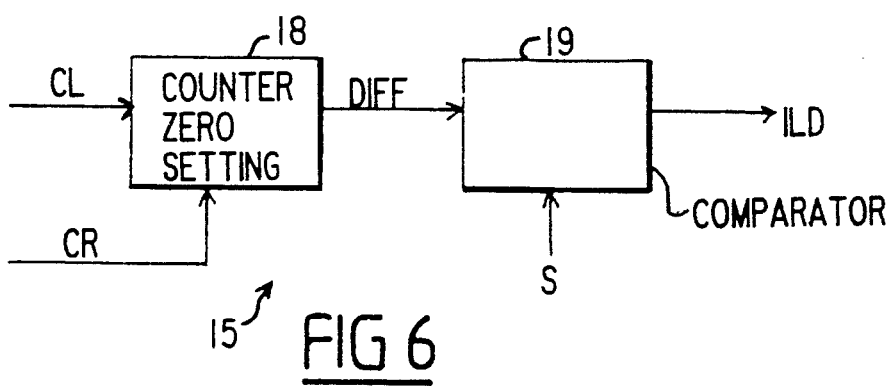
FIG. 6 is a block diagram of the circuit for the detection of long interruptions.

The circuit 15 for the detection of the long interruptions has been shown schematically in FIG. 6.

Essentially, an object of this circuit is the detection of the start of an interruption such as this, as defined at the start of the present description, in order to inhibit the mechanisms of correction of the cellular integrity (circuit 16) and of servo-control of the restoration clock (circuit 17).

This circuit 15 has a counter of local cells (CL beeps) with zero-setting by each cell received (CR beeps). The instantaneous value DIFF of this counter is applied to the input of a comparator 19 set at a threshold S which delivers a long interruption signal ILD when the contents of the counter go beyond the pre-determined threshold, i.e. when DIFF $\geq$ S. In other words, it is taken that there has been a long-term interruption when an absence of at least S consecutive received cells is observed (the counter no longer carries out a zero-setting operation for want of the CR beep) while the local clock continues to work (continuously producing the beep CL) corresponding to a consumption of cells in the buffer memory, and hence to a discharging of this buffer without any compensation for the diminishing of the buffer through a correlative loading of new cells.

Experiments have shown that a jitter of ±6 intercell periods has very little probability (probability < $10^{-8}$), and that it can therefore reasonably be said that there will be a long-term interruption in the event of there being no cells received for a duration of at least six intercell periods. In other words, the threshold S is set at a value S=6, this detection criterion providing for a rate of false alarms that is lower than $10^{-8}$ (a false alarm corresponding to an indication of a long interruption while the interruption in question arises only from simple fluctuations of the transmission time from one cell to the next one).

The first effect of the generation of a signal ILD will be to inhibit the mechanisms for correcting the cellular integrity and for the servo-control of the restoration clock; the way in which this function is implemented will be seen when the circuits 16 and 17 are described. Throughout the period when a signal ILD is produced, the restoration clock thus works freely at its acquired frequency but this will have no effect because the drift of this clock is very low.

Furthermore, the signal ILD will trigger the creation of filler cells, generated locally, to replace the non-received cells and thus maintain the integrity of the number of the cells in the flow transmitted to the receiver. The buffer memory will then remain at a filling level that is satisfactory for the working of the various correction and servo-control mechanisms.

As soon as a cell is received, the corresponding received cell CR beep will zero-set the counter 18 and will make the device fall back into a servo-controlled mode.

The circuit for the detection of losses and the insertion of cells shall now be described with reference to FIG. 7.

An object of this circuit is to detect and compensate for short spells of fading or short interruptions that are characterized as follows:

if the period of time is shorter than that of cell (8 μs) and if the error created by the fading relates to the addressing field, then this error will create losses or insertions of cells in the virtual circuit;

if the period of time is shorter than that of a cell, and if the error relates to the useful field, then this error will create erroneous cells which will be accepted, but it will be the task of the devices to provide for the control codes, acknowledgment codes etc;

if the period of time is greater than that of a cell, then there will be total loss of the cell or of the cells transmitted.

To detect the loss or the insertion of an isolated cell or of some successive cells, and to correct the anomaly in order to provide for the integrity of the flow of cells (and hence for the maintenance of the rate of synchronization between the transmitter and the receiver), a mechanism will be used for the counting of the cells at both ends (transmitter and receiver) of the link, with the regular transfer of the state of the upline counter towards the receiver; this transfer will be done by the insertion, in the flow, of a specific cell, which shall hereinafter be called a "marker".

The comparison between the value of the local counter (number of cells received) and the value of the marker received (number of cells transmitted) will make it possible to detect the loss or insertion of cells and to insert cells (in the case of lost cells) or eliminate cells (in the case of inserted cells) into or from the flow transmitted to the synchronous device.

Naturally, the mechanism implemented by the invention is aimed solely at ensuring the integrity of the flow of cells between transmitter and receiver, i.e. the maintaining of the synchronism, but it is not aimed at guaranteeing the integrity of the information transmitted. This checking of the integrity of the information will have to be done by a separate mechanism, of a type known per se [control code etc.). It will be noted, however, that there are applications for which a guarantee such as this is not sought, for example the transmissions of video images for which it is possible to accept some parasites introduced by the transmission.

At every N cells transmitted, the transmitter device will therefore create and transmit a marker, containing the value of the counter, through the network. For its part, the receiver will distinguish the markers from the information cells proper, and analyze the contents of this marker to detect the losses or insertions of cells.

To enable the method to withstand the loss of the marker before a detection of a long interruption blocks it, the contents of the markers are preferably protected against transmission errors by an error detector code. The erroneous markers will therefore be rejected, and the next error-free marker will be awaited before the comparison of the status of the counters is made (since the transmission counter is not zero-set from one marker to the next one but continues to go forward, the marker only transmits the instantaneous value of the counter).

Besides, the correction of the cellular integrity should be done without the coming into action of the mechanism (further below with reference to FIG. 8) for the servo-control of the restoration clock : this dictates a filtering of the fluctuations for a period of time greater than the interval between two successive markers.

Figure 7:
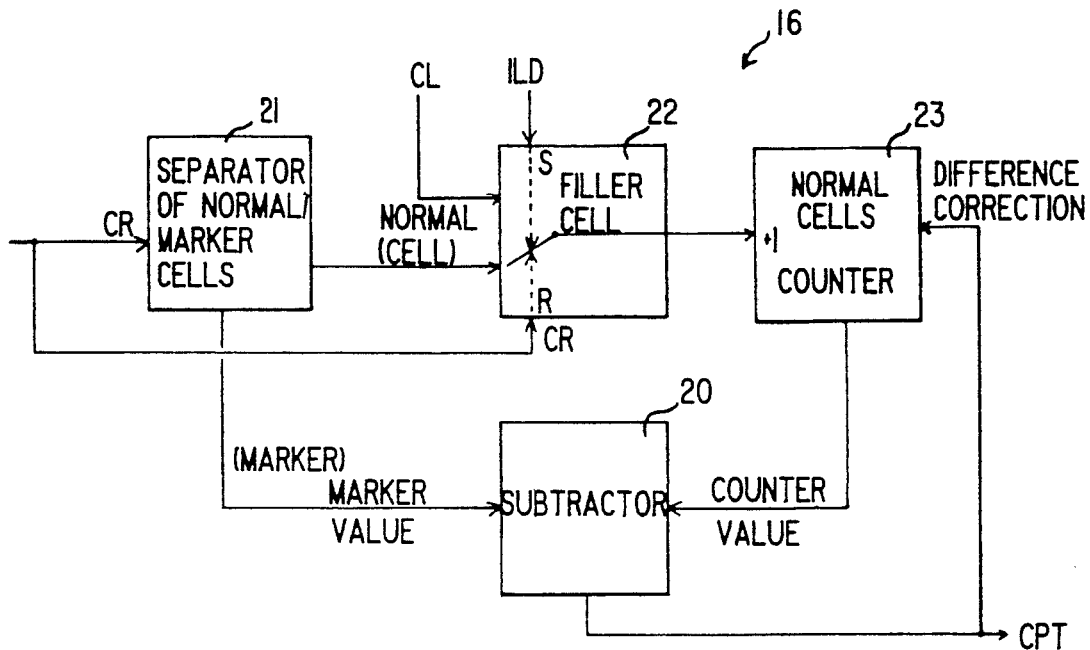
FIG. 7 is a block diagram of the circuit for the detection of losses or insertions of cells in the transmitted flow.

The circuit 16 for the detection of the losses and insertions of cells implementing these functions is illustrated in FIG. 7.

It comprises first of all a circuit 21 providing for discriminating between the normal cells and the markers and for filtering the erroneous markers after analysis of their error detector code.

In the event of the reception of a marker, the value contained in it is extracted and applied to one of the inputs of a comparator circuit 20, the other input of which receives the value of the local counter 23 of cells received.

In the case of a normal information cell, a pulse is applied to the circuit 22 in order to increment the local counter 23 by one unit. The circuit 22 makes it possible, in the event of a long interruption (signal ILD), to replace the non-received normal cell by a locally generated filler cell (local cell CL beep). The circuit 22 is constituted by a flip-flop circuit forming a two-way switch, positioned in a reception mode with respect to the filler cell in the event of the production of a signal ILD (input S : Set) and zero-set at the arrival of a received cell (beep CR applied to the input R: Reset).

In the event of a difference observed at an output of the comparator 20, the signal produced by this circuit modifies the value of the buffer pointer (contained in the register 10) by the addition or subtraction of a number of cells corresponding to the value CPT (correction of the buffer pointer). This value is also applied to the input of the local counter 23 in order to reset it at the received value of the marker.

It will be noted that the loss of a marker has no effect other than that of increasing the probability of undergoing a loss or insertion of cells, hence of having to correct a greater difference. All that will be done will be to wait for the next marker in order to carry out the correction.

It will also be noted that, in the very improbable event (given the precautions that will have been taken by means of the error correction codes) of acceptance of a false marker, a false correction will be compensated for by an antagonistic correction with the first following marker that is correctly received. It is also possible to limit the range of possible corrections to reasonable values ($\pm 6$ for example) to avoid abnormal corrections.

In the receiver initialization stage, the counter of received cells is off, and the first marker received will be used to initialize the value of the counter of received cells and to release this counter.

The circuit 17 for the reduction of the jitter and for the compensation of the drift of the clocks shall now be described with reference to FIG. 8.

The integrity of the number of cells transmitted having been ensured, there is a buffer memory available that should absorb the differences in propagation times in the network: this is because of the queueing mechanisms in each transit node gone through. This difference increases with the number of nodes to be crossed, and to the extent that the junctions used are loaded.

It will be noted incidentally that the buffer memory should be dimensioned so as to provide for the filling of half of this memory, and that there is a negligible probability of overflow. The size of this buffer memory should take account of the time taken to detect a long interruption that might empty the buffer, and should also take account of the maximum jitter due to the network before the introduction of the filler cells.

The restoration clock will then be servo-linked to the filler level of the reception buffer. This servo-link will filter the fast variations in the filling of the memory due to the previous phenomenon. In fact, only the slow drift of the clock should give rise to a resetting of the restoration clock, i.e. a permanent correction of its frequency.

With respect to the jitter, it has been shown, both theoretically and practically, that the distribution of probability of the waiting period per transit node follows a law close to an M/D/1/n type law (Poisson law of distribution of incoming data/deterministic service law/one data bank/n sources) when the sources can be likened to Poisson traffic generators. When several transits are placed in series and hence when several nodes are crossed, the distributions of probability of the waiting periods for each transit will be convoluted. At the end of five to ten transits, this operation leads to a distribution of probability close to a normal law having, as its mean, the sum of the mean values and, as its variance, the sum of the different variances. A law such as this has been shown schematically at C in FIG. 4.

This distribution, relating to a particular instant of observation, shows variations in time.

Thus, if it is assumed that a train of cells, spaced out in time at intervals of 125 μs, corresponds to the fastest service on a multiplex, with 15 cells served between two cells of the train, then there will be a low correlation between the waiting periods undergone by two successive cells of the train, at 2 Mbits/s in this example. The only constraint that exists is the need to keep to the order of the cells at reception.

In conclusion, therefore, it may be considered that the transmission time can be likened to a random value corresponding to the sum of a deterministic variable (mean value of the transit time) and of a Gaussian white noise.

With respect to the drift of the clocks, it is possible to be faced with either a sinusoidal drift of frequency or a permanent drift (slipping).

In the former case, it will suffice to estimate the maximum number of cells of the sinusoidal slipping to take account of it in the dimensioning of the buffer.

By contrast, in the latter case, it will be necessary to provide for a compensation of the drift by the servo-linking of the restoration clock.

At reception, the mean position of the buffer memory filling pointer reveals this drift, and it is therefore this parameter that will be used to control the servo-link.

For example, with a 2.048 Mbit/s clock with a stability of $10^{-5}$, there will be a maximum slipping of 20 bits per second, i.e. about one cell (256 bits) every 12 seconds.

Figure 8:
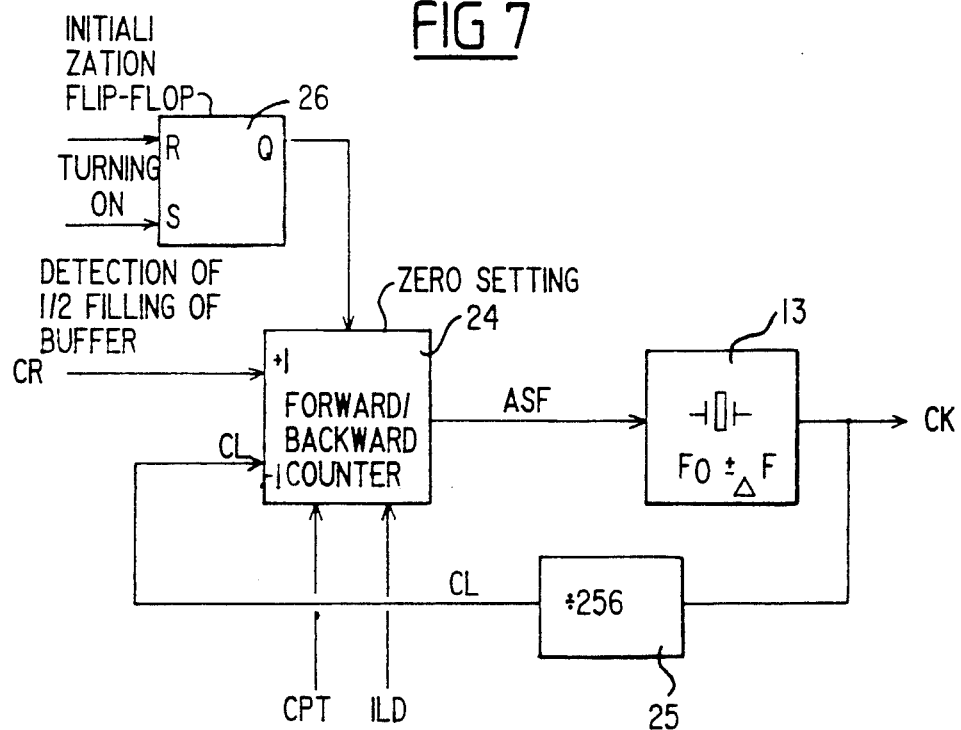
FIG. 8 is a block diagram of the circuit for the servo-control of the local clock of the receiver unit.

This servo-control can be implemented by the circuit 17 illustrated in FIG. 8 which, in addition to the above-mentioned restoration clock 13, includes a forward-/backward counter device 24 incremented by the beeps of received cells CR and decremented by the beeps of local cells CL, a correction being furthermore introduced by the buffer pointer correction signal CPT. Besides, the modification of the state of the counter is inhibited by the signal ILD in the event of detection of a long interruption.

This counter delivers a frequency servo-link signal ASF controlling the clock 13. It will be noted that the beeps of local cells CL are simply obtained by division, using a frequency divider means 25, of the clock signal CK delivered by the local clock.

In an initialization phase of the receiver, a circuit 26 enables the writing, in the buffer memory, of the cells received without permitting the reading of the buffer. When the buffer has thus been half-filled, permission will be given for reading at the rate of the local clock (application of a signal to the input S (Set) of the flip-flop circuit 26), and the position of the buffer memory pointer will be initialized at its reference value, the counter 24 being set at zero.

To carry out the frequency correction, it is advantageously possible to use only two values of restoration clock frequencies, each located at an end of the normal operating frequency, namely two frequencies $F_o - \Delta F$ and $F_o + \Delta F$ with $\Delta F/F = 10^{-4}$.

Either one of these two frequencies is then used as a function of the sign of the difference between the instantaneous position of the filler pointer of the buffer of the cells received and the mean filling level of this buffer. At regular intervals, determined according to the restoration clock, the new value of the restoration frequency is chosen as a function of the position of the pointer. With the numerical values indicated further above, the frequency of the corrections will be at least 8000 corrections per second, and the correction will be a $\pm 10^{-4} F_o$ correction.

What is claimed is:

1. A device for the transmission of synchronous information by an asynchronous network in which information elements are conveyed by packets of data bits between a transmitter unit and a receiver unit, each of these packets being formed by an information cell comprising a header carrying an address and a useful field bearing the information to be transmitted, the transmitter unit and the receiver unit working with each other in a synchronous mode based on respective plesiochronous local clocks, wherein the receiver unit comprises a restoration buffer receiving, at an input, a flow of information cells at an irregular rate of the asynchronous network and delivering, at an output, the information cells at a regular rate of the local clock, wherein said device comprises:

- means for detecting and compensating for fading of transmission of the flow of information cells received by the receiver unit;
- means for detecting and compensating for a loss or insertion of information cells in the flow of the information cells received by the receiver unit, wherein said means for detecting and compensating for the loss or insertion of information cells in the flow of information cells received by the receiver comprises:
  - means for establishing a transmission count value, by local counting of a number of information cells delivered to the asynchronous network by the transmitter unit;
  - means for periodically generating a specific cell containing the transmission count value thus established and transmitting this specific cell to the receiver unit through the asynchronous network;
  - means for establishing a reception count value, by local counting of a number of information cells received from the asynchronous network by the receiver unit;
  - means for discriminating the specific cells and the information cells among the cells received by the receiver unit; and
  - means for comparing, at each reception of a specific cell, the locally established reception count value with the corresponding transmission count value contained in this specific cell and, in an event of a difference between the values thus obtained, incrementing or decrementing an address pointer of said restoration buffer by this difference;
- means for reducing jitter introduced by the asynchronous transmission of the information cells into the asynchronous network and for compensating for the plesiochronism of the local clocks of the transmitter unit and the receiver unit.

2. The device according to claim 1, wherein the means for detecting and compensating for the fading of transmission of the flow of information cells received by the receiver unit comprises:
- means for counting the number of information cells received at an input and the number of information cells delivered at an output of the restoration buffer and giving an instantaneous value of the corresponding difference;
- means for comparing this difference with a predetermined threshold and, if this threshold is exceeded, generating filler cells at the local clock rate and applying these filler cells tot he input of the restoration buffer.

3. The device according to claim 1, wherein said means for reducing jitter introduced by the asynchronous transmission of the information cells into the asynchronous network and for compensating for the relative plesiochronism of the local clocks of the transmitter unit and the receiver unit comprises means for servo-linking the local clock of the receiver unit to an error signal as a function of a degree of filling of the restoration buffer.

4. The device according to claim 2, wherein said means for reducing jitter introduced by the asynchronous transmission of the information cells into the asynchronous network and for compensating for the relative plesiochronism of the local clocks of the transmitter unit and the receiver unit comprises means for servo-linking the local clock of the receiver unit to an error signal as a function of a degree of filling of the restoration buffer.

5. A device for the transmission of synchronous information by an asynchronous network in which information elements are conveyed by packets of data bits between a transmitter unit and a receiver unit, each of these packets being formed by an information cell comprising a header carrying an address and a useful field bearing the information to be transmitted, the transmitter unit and the receiver unit working with each other in a synchronous mode based on respective plesiochronous local clocks, wherein the receiver unit comprises a restoration buffer receiving, at an input, a flow of information cells at an irregular rate of the asynchronous network and delivering, at an output, the information cells at a regular rate of the local clock wherein said device comprises:

- means for detecting and compensating for a loss or insertion of cells in a flow of information cells received by the receiver unit, comprising:
  - means for establishing a transmission count value, by local counting of a number of information cells delivered to the asynchronous network by the transmitter unit;
  - means for periodically generating a specific cell containing the transmission count value thus established and transmitting this specific cell to the receiver unit through the asynchronous network;
  - means for establishing a reception count value, by local counting of a number of information cells received from the asynchronous network by the receiver unit;
  - means for discriminating the specific cells from the information cells among the cells received by the receiver unit; and
  - means for comparing, at each reception of a specific cell, the locally established reception count value with the corresponding transmission count value contained in this specific cell and, in an event of a difference between the values thus obtained, incrementing or decrementing an address pointer of said restoration buffer by this difference.

6. The device according to claim 5, further comprising means for detecting and compensating for fading of transmission of the flow of information cells received by the receiver unit comprising:
- means for counting a number of cells received at an input and a number of cells delivered at an output of the restoration buffer and giving an instantaneous value of the corresponding difference;
- means for comparing this difference with a predetermined threshold, and if this threshold is exceeded, generating filler cells at the local clock rate and applying these filler cells tot he input of the restoration buffer.

7. The device according to claim 5, further comprising means for reducing jitter introduced by the asynchronous transmission of the information cells into the asynchronous network and for compensating for the relative plesiochronism of the local clocks of the transmitter unit and the receiver unit and comprising means for servo-linking the local clock of the receiver unit to an error signal as a function of a degree of filling of the restoration buffer.

8. The device according to claim 6, further comprising means for reducing jitter introduced by the asynchronous transmission of the information cells into the asynchronous network and for compensating for the relative plesiochronism of the local clocks of the transmitter unit and the receiver unit and comprising means for servo-linking the local clock of the receiver unit to an error signal as a function of a degree of filling of the restoration buffer.

* * * * *